March 17, 1936.  J. N. ICE  2,034,344
POWER CONTROL FOR VEHICLE CLUTCH AND BRAKE
Filed March 20, 1935
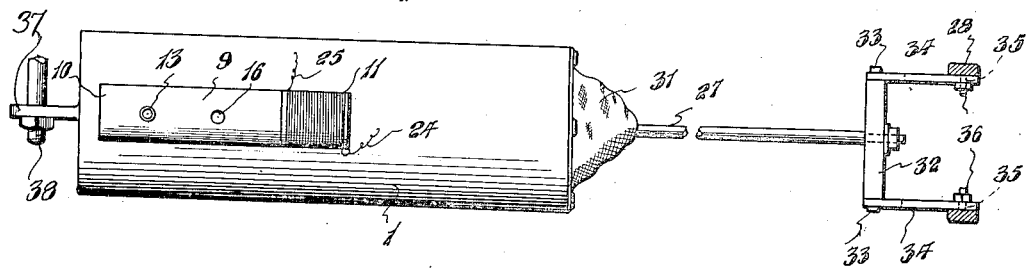
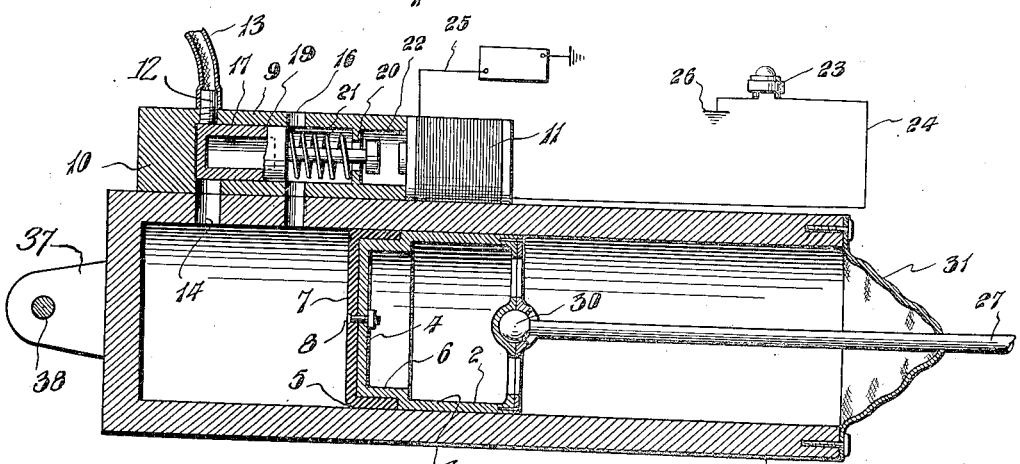
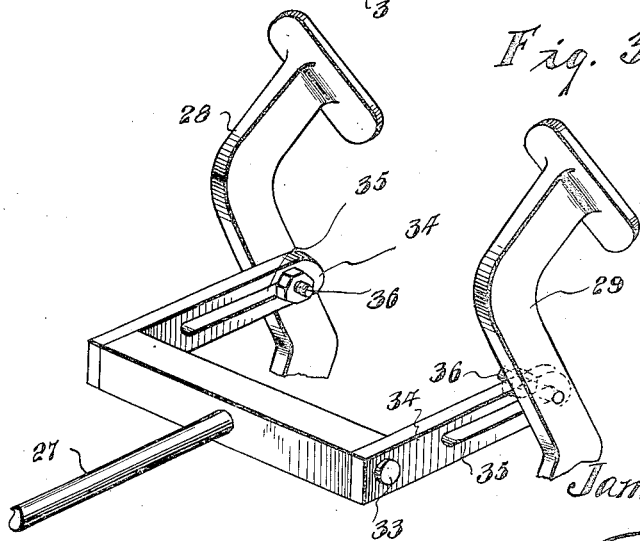
James N. Ice, Inventor Patented Mar. 17, 1936

2,034,344

UNITED STATES PATENT OFFICE 2,034,344

POWER CONTROL FOR VEHICLE CLUTCH AND BRAKE

James N. Ice, Wheeling, W. Va., assignor of one-half to James S. Paull, Wheeling, W. Va., and one-twentieth to Samuel K. Frank, Wheeling, W. Va.

Application March 20, 1935, Serial No. 12,072

3 Claims. (Cl. 192—13)

This invention is directed to a power control for vehicle brakes selectively governed at will by the operator.

The primary object of the invention is the provision of a servo motor of the vacuum controlled type with the vacuum produced in the well known manner from the manifold of the engine, together with a valve for controlling vacuum application to the servo motor and electrically operated means for opening the valve, the valve in closed position opening the vacuum side of the servo motor to the atmosphere.

The invention further comprehends the provision of a connection between the plunger of the servo motor and the brake and clutch pedals of the vehicle, so that in operation of the servo motor to set the brake the clutch pedal and brake pedal are simultaneously operated with the clutch pedal moving to declutching position and the brake pedal moving to brake applying position.

A further object of the invention is the provision of a connection between the servo motor and brake and clutch pedals which will insure simultaneous operation of these pedals in servo motor control, while at the same time permitting independent and selective operation of either the clutch or brake pedal through conventional manual control.

The invention is illustrated in the accompanying drawing, in which:

Figure 1 is a plan view of the construction.

Figure 2 is a longitudinal sectional view through the servo motor and controlling valve.

Figure 3 is a perspective view showing the clutch and brake pedal levers and the connection between said levers and the servo motor.

The invention includes a servo motor in the form of a cylindrical casing 1 in which is arranged a plunger 2, hollow or not as preferred, the annular wall 3 of which presents a relatively long bearing on the interior surface of the casing 1. The plunger 2 is closed at its forward end, as at 4, and at such forward end circumferentially reduced to present a space and shoulder to receive a flexible gasket 5 of hollow cup shape, the side walls of which fit in the reduced portion 6 of the plunger and the main wall 7 of which overlies the closed end 4 of the plunger, a bolt or other removable connection 8 serving to secure the gasket in place. This construction provides against leakage around the plunger, as will be understood.

Secured to and, if desired, forming an integral part of the servo motor casing 1 is a valve casing 9 closed at the forward end, as at 10, and provided at the rear end in any appropriate manner to receive and hold an electro-magnet 11. The valve casing 9 is formed adjacent its closed end 10 with an inlet 12 communicating through appropriate pipe 13 with the manifold of the engine or other source of suction. Opposite the inlet 12 the valve casing 9 and the wall of the servo motor casing 1 are provided with registering openings 14 to which the air under the appropriate suction is withdrawn from the casing 1 on the gasket side of the plunger 2. Rearwardly of the openings 12 and 14 the wall of the servo motor casing 1 and the wall of the valve casing 9 are formed to provide openings 15 and 16, respectively, through which atmosphere is admitted to balance the plunger for the release of the brakes.

Slidably mounted in the valve casing 9 is an elongated valve 17, the length of which is such that in no position of the valve can the openings 12 and 16 be simultaneously bridged. The rear end of the valve is reduced in diameter to provide a stem 18 forming with the main body of the valve a shoulder 19 between which and an appropriate shoulder 20 provided on the interior of the valve casing 9 is arranged an expansion spring 21 which continually urges the valve to a position to cut off communication between the openings 12 and 14. The rear end of the stem 18 is in the form of an enlarged disk 22, of appropriate material, such for instance as steel, serving as an armature for the electro-magnet 11. If desired, the entire valve structure may be constructed of steel, hollow if desired, and enlarged to provide the armature.

The electro-magnet is energized through a switch 23, preferably in the form of an ordinary button, though obviously of any appropriate character. The circuit includes a lead 24 from the electro-magnet to one side of the switch and a lead 25 from the electro-magnet to the car battery, the other side of the switch being grounded at 26 to complete the circuit when the switch is closed through the usual ground of the battery.

The plunger 2 is connected by a rod 27 to the clutch pedal 28 and brake pedal 29. The plunger end of the rod 27 has a swivelled connection at 30 with the plunger, and a protecting cap 31 of flexible material is secured to the open end of the casing 1 and slidably embraces the rod 27 to prevent accumulation of dust and dirt within the servo motor casing. The rear end of the rod 27 is connected to a cross bar 32 to the respective ends of which cross bar are swingingly connected, as by bolts or pins 33, rearwardly extending side bars 34 each of which has a longitudinally ranging slot 35. Pins 36 are secured to the proximate faces of the brake and clutch pedals 28 and 29 and these pins pass through the slots 35 in the respective side bars 34, nuts or other means being used to prevent disconnection.

The forward end of the servo motor casing 1 is formed or provided with an eye member 37 which is loosely hung on a bolt or other like support 38 projecting from an appropriate part of the vehicle, preferably the engine structure. The servo motor casing carrying the valve casing is thus hung or supported for relative free vertical swinging and the plunger rod 27 is swivelled to the plunger to provide similar freedom and relative movement between the plunger and rod. It is to be also noted that the respective side bars 34 of the connection between the pedals and the rod 27 are capable of independent swinging movement either in the same or opposite directions. The rear end of the rod 27 is connected to the cross bar 32 and this connection may be a swivelled one or a rigid one, as preferred.

The swivelled mounting of the parts permits a relative freedom of movement which, so far as the servo motor is concerned, will permit a straight-line movement of the plunger even if the casing 1 is momentarily out of alignment. All binding of these parts in operation is thus prevented. As will later appear, the connection of the servo motor to the pedals provides for the independent manual operation of either as may be desired or necessary. By the independent swinging capability of the side bars 34, this independent movement of the pedals is accommodated without restriction. The switch button may be conveniently located at any part of the vehicle accessible to the driver, it being contemplated to position it immediately adjacent the accelerator if foot control is desired, or on the steering wheel if hand control is desired.

Through control of the push button switch, the electro-magnet is energized, the valve 17 moved to a position to establish communication between the source of suction and the servo motor. The plunger 2 is operated and the clutch and brake pedals simultaneously moved to declutch the engine and apply the brakes. If the electro-magnet circuit is opened, the valve is moved to closed position under the influence of the spring 21 and the atmosphere port admits air under atmospheric pressure to the suction side of the servo motor and the conventional return springs of the brakes release the brakes. In this release movement, the plunger of course moves toward the right in Figure 1 and this permits a simultaneous and uniform movement of the clutch and brake pedals. By proper selection of the parts of the connection, it is easily provided that in this movement the clutch pedal permits the clutch to take hold at the moment the brakes free the wheels. This is important as it prevents any tendency to choke the motor if the clutch is closed before the brakes are released or to start the car with a jerk, or to permit a tendency to rearward movement of the car if the brake is released before the clutch takes hold.

Obviously, through the provision of the slots 35, either pedal may be operated independently when desired without interfering with the position of the other pedal, the swinging possibility of the side arm 34 in the operating pedal permitting such operation without disturbing the connection.

The construction provides for a convenient service application of the brakes or for an emergency application thereof. Thus if the push button is operated intermittently, the brakes may be applied evenly and smoothly to check the running of the car as in a conventional service application. If, on the contrary, the closing of the push button is maintained, the practically instantaneous response of the plunger 2 to the full power of the suction or vacuum will provide an emergency application.

The construction is extremely simple and provides a unitary construction complete in itself which may be installed on any vehicle, and which for the purpose of installation requires only the provision of the support 38 for the servo motor and the application of the pins 36 to the respective pedals.

What is claimed to be new is:

1. A combined clutch and brake control for vehicles, including a servo motor casing, a plunger therein, a valve casing secured to the motor casing and in open communication therewith through an inlet opening and an exhaust opening, a source of suction in communication with the valve casing diametrically opposite the inlet opening, an exhaust opening in the valve casing leading to the atmosphere, a valve operative in the casing, spring means for holding the valve in position to close the inlet opening from the suction source and the inlet opening to the motor casing and in another position to free said openings and close the exhaust opening, electrically controlled means for operating the valve in opposition to the spring, and a connector between the plunger and clutch and brake pedals, said connector having universal connection with the plunger and sliding connection with the pedals.

2. A construction as defined in claim 1, wherein the motor casing is mounted for swinging movement whereby, in addition to the universal connection of the connector with the plunger, the pull of the plunger is always direct on the pedals regardless of the movement of the parts.

3. A construction as defined in claim 1, wherein the connection between the connector and pedals is in the form of a bar rigidly secured to the connector, and side arms pivotally connected to the bar and slidably connected to the pedals.

JAMES N. ICE.